(12) United States Patent
Yabuuchi (10) Patent No.: US 9,060,147 B2
(45) Date of Patent: Jun. 16, 2015

(54) IMAGE READING DEVICE CAPABLE OF EXECUTING BLANK ELIMINATION PROCESSING AND FRAME ERASURE PROCESSING AND AN IMAGE FORMING APPARATUS INCLUDING THE SAME

(71) Applicant: KYOCERA DOCUMENT SOLUTIONS INC., Osaka (JP)

(72) Inventor: Yasuyuki Yabuuchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 15 days.

(21) Appl. No.: 13/859,014

(22) Filed: Apr. 9, 2013

(65) Prior Publication Data

US 2013/0321833 A1 Dec. 5, 2013

(30) Foreign Application Priority Data

May 31, 2012 (JP) .................................. 2012-124037

(51) Int. Cl.
G06F 3/12 (2006.01)
H04N 1/38 (2006.01)
H04N 1/00 (2006.01)

(52) U.S. Cl.
CPC ............. *H04N 1/38* (2013.01); *H04N 1/00278* (2013.01)

(58) Field of Classification Search
USPC ......... 358/474, 400, 401, 1.6, 1.13, 451, 530, 358/1.9, 464, 1.15
See application file for complete search history.

(56) References Cited

U.S. PATENT DOCUMENTS

| 5,327,261 | A | * | 7/1994 | Hirota et al. | .................. 358/449 |
| 5,377,019 | A | * | 12/1994 | Okisu et al. | .................. 358/464 |
| 6,011,635 | A | * | 1/2000 | Bungo et al. | .................. 358/488 |
| 8,270,041 | B2 | * | 9/2012 | Fujiwara | ....................... 358/448 |
| 2006/0239357 | A1 | * | 10/2006 | Bushell | ..................... 375/240.23 |
| 2011/0181909 | A1 | * | 7/2011 | Kakoi | .......................... 358/1.15 |
| 2012/0194880 | A1 | * | 8/2012 | Muroi | ........................... 358/474 |
| 2013/0321833 | A1 | * | 12/2013 | Yabuuchi | ..................... 358/1.13 |

FOREIGN PATENT DOCUMENTS

| EP | 002670124 | * | 12/2013 | ............... H04N 1/38 |
| JP | 2002-165054 A | | 6/2002 | |
| JP | 2010-068227 A | | 3/2010 | |

* cited by examiner

*Primary Examiner* — Jerome Grant, II
(74) *Attorney, Agent, or Firm* — Morgan, Lewis & Bockius LLP (57) ABSTRACT

An image reading device includes a blank elimination processing portion that performs blank elimination processing for eliminating image data of an original document if a preset blank detection area in the original document is blank and a frame erasure processing portion that performs frame erasure processing for correcting image data of an original document so that any image in an area other than a preset effective image area in the original document does not appear. The blank elimination processing portion performs resetting in which a superimposition area where the preset blank detection area and the preset effective image area are superimposed on each other is set as a new blank detection area.

7 Claims, 11 Drawing Sheets

IMAGE READING DEVICE CAPABLE OF EXECUTING BLANK ELIMINATION PROCESSING AND FRAME ERASURE PROCESSING AND AN IMAGE FORMING APPARATUS INCLUDING THE SAME

INCORPORATION BY REFERENCE

This application is based on and claims the benefit of priority from Japanese Patent Application No. 2012-124037 filed on May 31, 2012, the contents of which are hereby incorporated by reference.

BACKGROUND

The present disclosure relates to an image reading device and an image forming apparatus.

Conventionally, there is known an image reading device that reads an original document and generate image data, and such an image reading device is mounted in an image forming apparatus such as, for example, a multifunctional peripheral. Image data of an original document obtained through reading by the image reading device is outputted to a printout section of the image forming apparatus, and the printout section prints an image of the original document on a paper sheet and outputs the paper sheet.

By the way, there is an image reading device of a type capable of performing frame erasure processing. Frame erasure processing refers to processing for correcting image data of an original document so that any image in an area (frame erasure area) other than a preset printing area in the original document is not printed. This allows a user, by presetting a desired printing area, to perform printing of only an image contained in the desired printing area.

Moreover, there is an image reading device of a type capable of performing blank elimination processing. Blank elimination processing refers to processing for eliminating image data of an original document if a preset blank detection area in the original document is blank. This allows a user, by presetting a desired blank detection area, to stop printing based on image data of an original document in which the desired blank detection area is blank.

Furthermore, there is an image reading device of a type that performs resetting in which the entirety of a preset printing area in an original document is newly set as a blank detection area. In this type of image reading device, if any image exists in at least part of a printing area in a read original document, it is judged that the original document is not blank, and if there exists no image in the printing area, it is judged that the original document is blank.

An image reading device of a type capable of executing both of blank elimination processing and frame erasure processing executes, in a case of having accepted a command from a user to execute both of blank elimination processing and frame erasure processing, both of blank elimination processing and frame erasure processing. In this case, when a blank detection area and a printing area vary in their set positions (set sizes) from each other, the following inconvenience may arise.

For example, when a blank detection area and a printing area vary in their set positions (set sizes) from each other, even though there exists no image in the preset printing area, any image may exist in the preset blank detection area. In this case, due to the image existing in the preset blank detection area in an original document, the image reading device does not eliminate image data of the original document and performs frame erasure processing with respect to the image data of the original document so that the image in an area other than the preset printing area is not printed. The image reading device then outputs the image data of the original document thus subjected to image processing to a printout section of an image forming apparatus. As a result, there arises an inconvenience that a blank sheet with no image printed thereon is outputted.

Furthermore, even if any image exists in a preset printing area in an original document, a user may desire to stop printing based on image data of the original document (such as, for example, in a case where any image exists only at an end of the preset printing area in the original document). In this case, when an image reading device of the type that performs resetting in which the entirety of a preset printing area in an original document is newly set as a blank detection area is used to read the original document, due to the image existing in the printing area, it is judged that the read original document is not blank. Consequently, a paper sheet with the image, which is unwanted by the user, printed thereon is outputted.

SUMMARY

The present disclosure has been made to solve the above-described problems, and it is an object of the present disclosure to prevent a blank sheet with no image printed thereon from being outputted. Moreover, it is also an object of the present disclosure to prevent a paper sheet with any unwanted image printed thereon from being outputted.

In order to achieve the above-described objects, an image reading device of the present disclosure includes an image reading portion, a blank elimination processing portion, and a frame erasure processing portion. The image reading portion reads an original document. Based on image data of an original document obtained through the reading by the image reading portion, the blank elimination processing portion judges whether or not a preset blank detection area in the original document is blank, and performs blank elimination processing for eliminating image data of an original document if the preset blank detection area in the original document is blank. The frame erasure processing portion performs frame erasure processing for correcting image data of an original document so that any image in an area other than a preset effective image area in the original document does not appear. When performing the blank elimination processing in a case where the frame erasure processing portion is to perform the frame erasure processing, the blank elimination processing portion performs resetting in which a superimposition area where the preset blank detection area and the preset effective image area are superimposed on each other is set as a new blank detection area, and designates the new blank detection area after the resetting as a target area for blank detection.

DETAILED DESCRIPTION (Configuration of Image Forming Apparatus Including Image Reading Device)

First, by taking as an example a multifunctional peripheral capable of executing a plurality of types of jobs such as copying, scanning, and faxing, a description is given of a configuration of an image forming apparatus including an image reading device.

Figure 1:
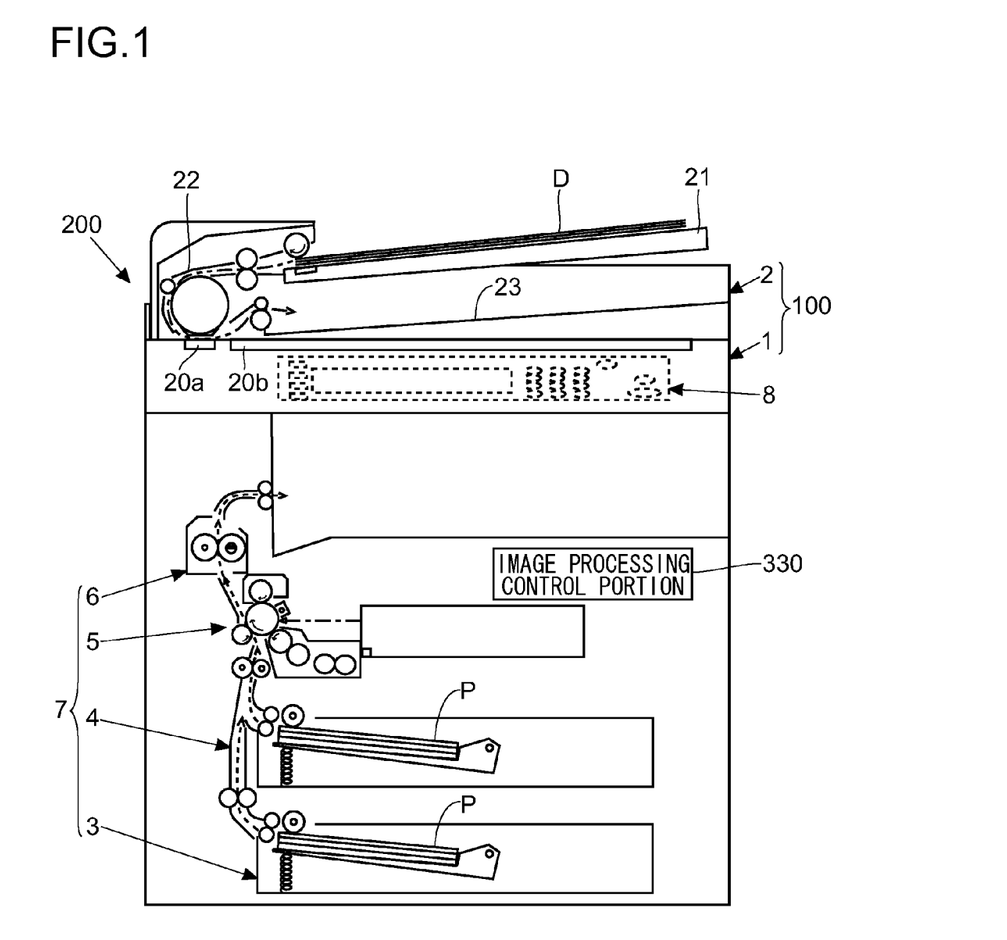
FIG. 1 is a schematic view of an image forming apparatus (image reading device) according to one embodiment of the present disclosure.

As shown in FIG. 1, in image forming apparatus 200 of this embodiment, an image reading device 100 is disposed at an upper part of the apparatus. The image reading device 100 includes an image reading portion 1 and an original document conveying portion 2. The image reading portion 1 reads an original document D and generates image data. The original document conveying portion 2 conveys the original document D to the image reading portion 1 and holds down the original document D when being read at the image reading portion 1.

Furthermore, the image forming apparatus 200 includes a printout section 7 that is composed of a paper feed portion 3, a paper sheet conveying portion 4, an image forming portion 5, and a fixing portion 6. Based on image data, the printout section 7 prints an image on a paper sheet P and outputs the paper sheet P. Furthermore, the image forming apparatus 200 includes an operation panel 8 (corresponding to "an operation portion").

(Configuration of Image Reading Device)

Next, a description is given of one example of a configuration of the image reading device 100 (the image reading portion 1 and the original document conveying portion 2) of this embodiment.

Figure 2:
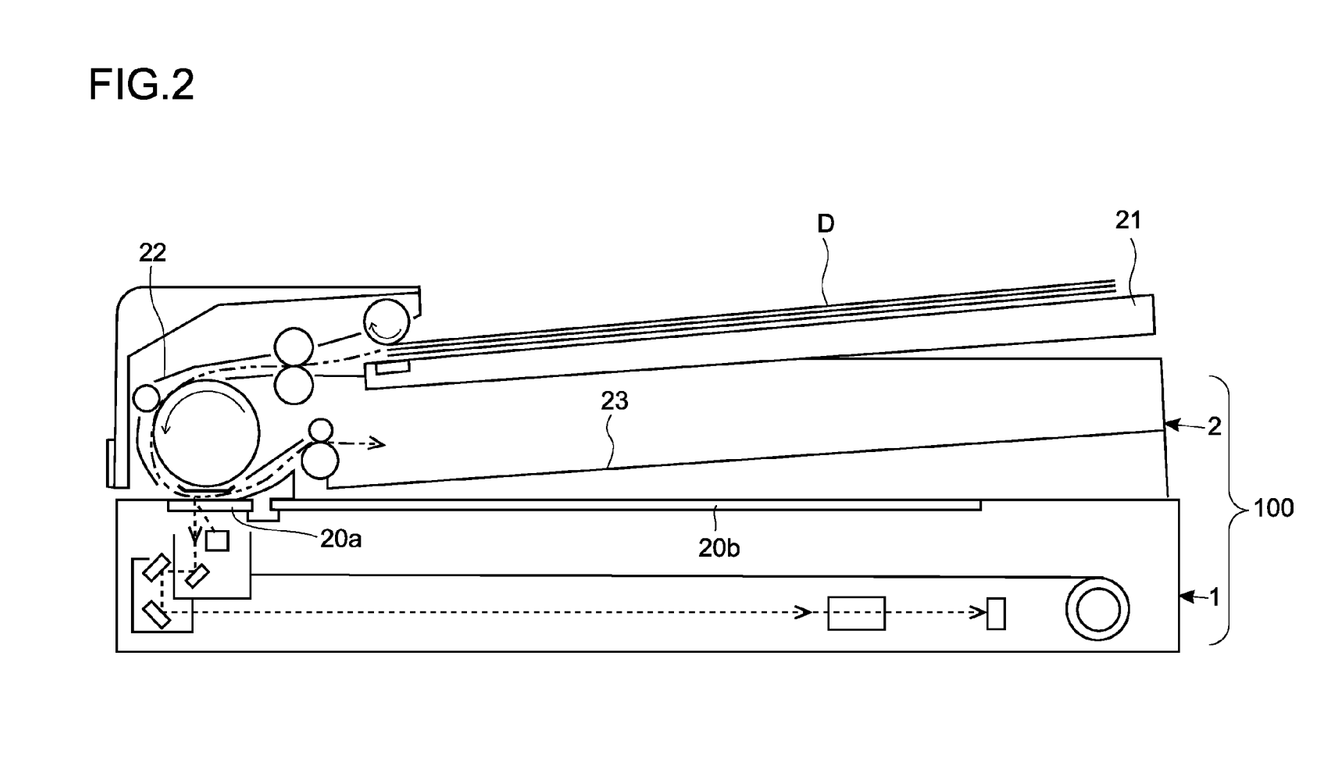
FIG. 2 is a detailed view of the image reading device included in the image forming apparatus shown in FIG. 1.

As shown in FIG. 2, the original document conveying portion 2 draws out the original document D set on an original document set tray 21 and ejects the original document D onto an original document ejection tray 23 via an original document conveying path 22. In a case where a plurality of original documents D are set on the original document set tray 21, the original document conveying portion 2 automatically and sequentially draws out, one by one, the plurality of original documents D.

The original document conveying portion 2 is mounted to the image reading portion 1 such that, with respect to the image reading portion 1, the original document conveying portion 2 is pivotable (openable/closable) about a rotary shaft (not shown) provided on a back side. In a state where the original document conveying portion 2 is closed (a state shown in FIG. 2), the image reading portion 1 and the original document conveying portion 2 are overlaid on each other, and a contact glass 20a for conveyance reading and a contact glass 20b for placement reading are covered by the original document conveying portion 2.

(Frame Erasure Processing)

Next, frame erasure processing is described. Frame erasure processing refers to processing for correcting image data of the original document D so that any image in an area (frame erasure area) other than a preset printing area (corresponding to "an effective image area") in the original document D does not appear (processing for changing a pixel value of each pixel in the area other than the preset printing area in the original document D so that contents therein are deleted). That is, once frame erasure processing has been executed, any image in the frame erasure area in the original document D is not printed.

Figure 3:
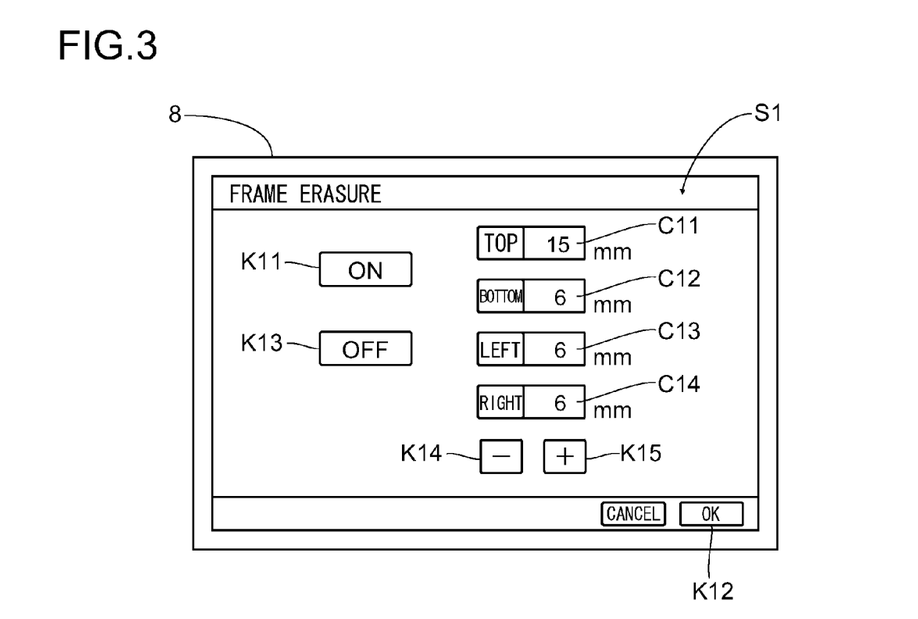
FIG. 3 is a view for explaining a setting screen displayed when, in the image forming apparatus shown in FIG. 1, setting related to frame erasure processing (setting of a printing area (frame erasure area)) is accepted.

In a case where a user has commanded that frame erasure processing be executed, an image processing control portion 330 (see FIG. 1) performs frame erasure processing. On the other hand, in a case where the user has not commanded that frame erasure processing be executed, the image processing control portion 330 does not perform frame erasure processing. When accepting from the user a command as to whether or not frame erasure processing is to be executed, the operation panel 8 displays a setting screen S1 shown in FIG. 3. For example, the operation panel 8 displays a system menu (not shown) related to an overall operation of the apparatus. Upon an item related to frame erasure processing being selected from the system menu, the operation panel 8 displays the setting screen S1 shown in FIG. 3. The setting screen S1 shown in FIG. 3 is merely one example, and a screen layout or the like can be changed.

When the setting screen S1 is being displayed, upon an "ON" soft key K11 being touched and an "OK" soft key K12 being subsequently touched, the operation panel 8 accepts that frame erasure processing is to be executed. In a case where frame erasure processing is not to be executed, it is appropriate that a "OFF" soft key K13 be touched and the soft key K12 be subsequently touched.

Figure 4:
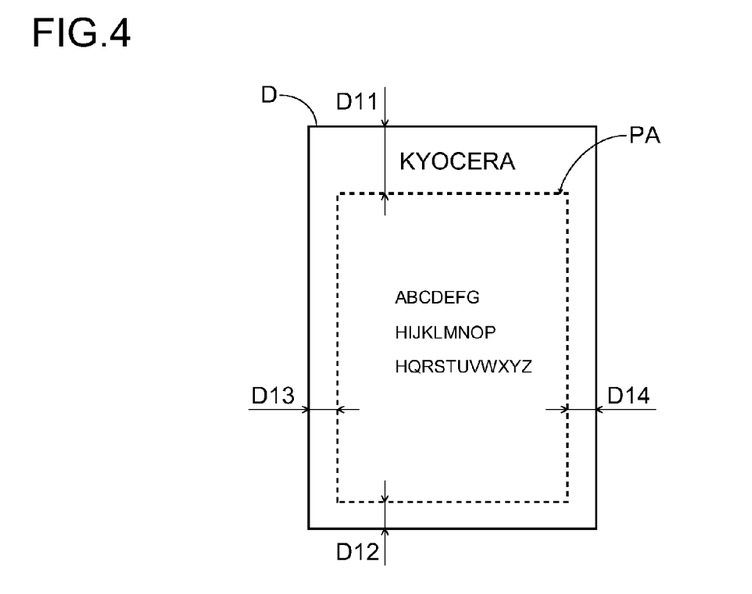
FIG. 4 is a view for explaining a printing area (frame erasure area) that is preset in the image forming apparatus shown in FIG. 1.

Furthermore, when displaying the setting screen S1, the operation panel 8 shows, on the setting screen S1, indication boxes C11 to C14 in which set values indicative of a position (size) of a printing area are indicated, respectively. For example, it is assumed that an area PA enclosed by a broken line, which is shown in FIG. 4, has been preset as a printing area. In this case, in the indication box C11, a spacing D11 between an upper end of the printing area PA and an upper end of the original document D (an upper end position of the printing area PA) is indicated, and in the indication box C12, a spacing D12 between a lower end of the printing area PA and a lower end of the original document D (a lower end position of the printing area PA) is indicated. In the indication box C13, a spacing D13 between a left end of the printing area PA and a left end of the original document D (a left end position of the printing area PA) is indicated, and in the indication box C14, a spacing D14 between a right end of the printing area PA and a right end of the original document D (a right end position of the printing area PA) is indicated.

Moreover, on the setting screen S1, a minus key K14 and a plus key K15 for changing set values of the printing area PA are shown. Upon any one of the indication boxes C11 to C14 being touched, the operation panel 8 determines that a set value indicated in the touched indication box is a set value to be changed, and upon the minus key K14 or the plus key K15 being subsequently touched, the operation panel 8 adjusts the set value to be changed accordingly.

As for set values indicative of a position (size) of the printing area PA, for example, set values set before shipment of the apparatus may be stored in a storage portion (not shown) in the apparatus. In this case, if an operation for changing set values of the printing area PA is not performed, as the set values of the printing area PA, set values set before shipment of the apparatus are adopted.

Figure 5:
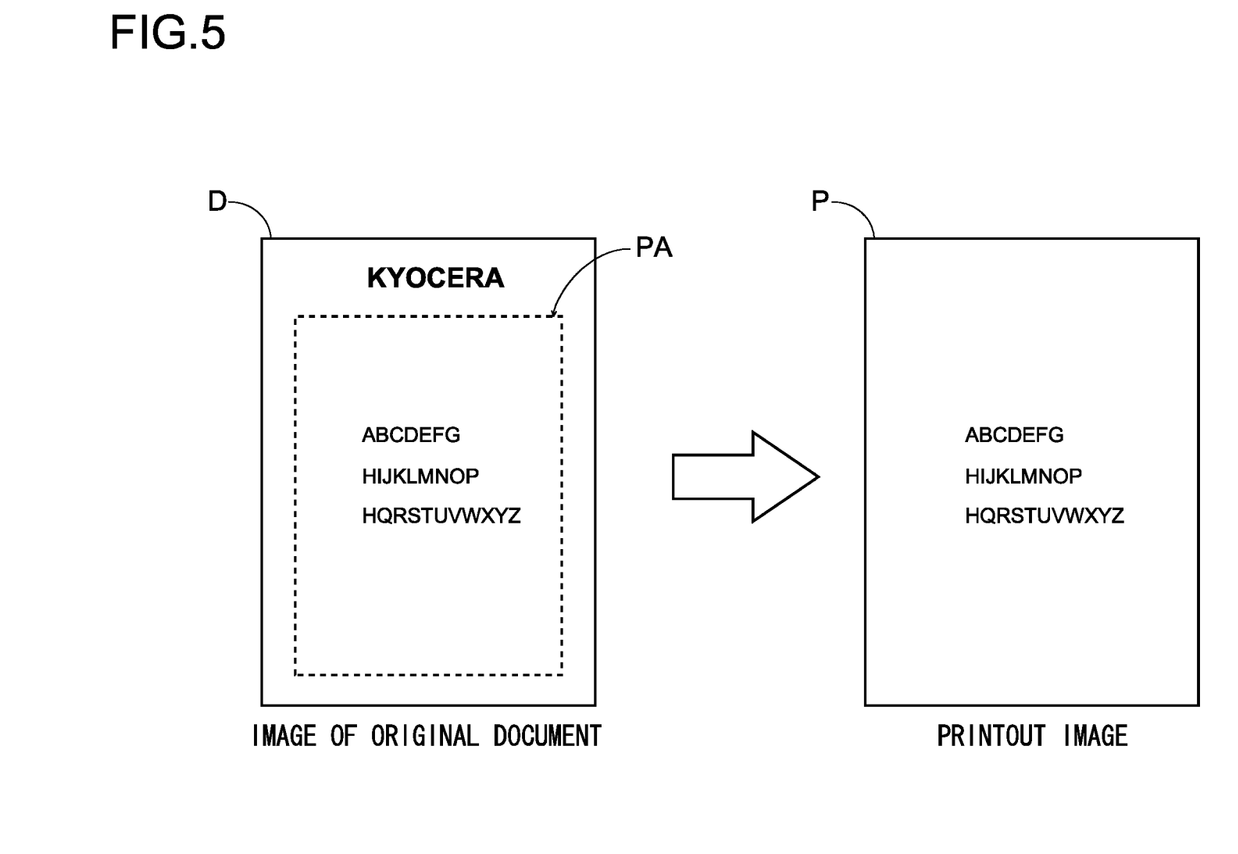
FIG. 5 is a view for explaining frame erasure processing performed in the image forming apparatus shown in FIG. 1.

In a case where a user has commanded that frame erasure processing be executed, after the original document D is read by the image reading portion 1, the image processing control portion 330 performs frame erasure processing with respect to image data of the original document D obtained through the reading by the image reading portion 1. For example, with respect to the image data of the original document D, the image processing control portion 330 replaces each pixel value in an area other than the preset printing area PA with a value corresponding to white. Thus, as shown in FIG. 5, even if images exist in both of the preset printing area PA and the area other than the printing area PA, respectively, while the image in the preset printing area PA is printed, the image in the area other than the preset printing area PA is not printed.

(Blank Elimination Processing)

Next, blank elimination processing is described. Blank elimination processing refers to processing for eliminating image data of the original document D if a preset blank detection area in the original document D is blank.

Figure 6:
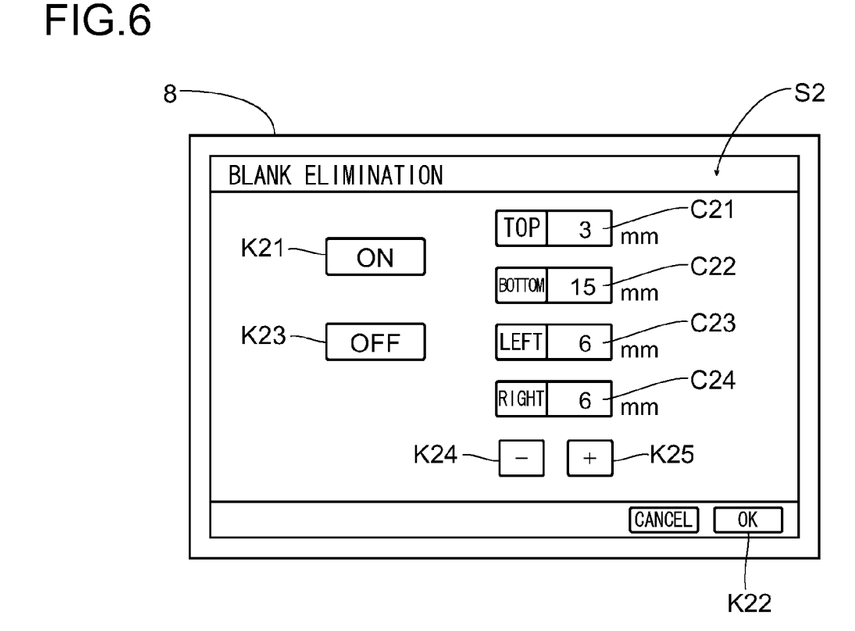
FIG. 6 is a view for explaining a setting screen displayed when, in the image forming apparatus shown in FIG. 1, setting related to blank elimination processing (setting of a blank detection area) is accepted.

In a case where a user has commanded that blank elimination processing be executed, the image processing control portion 330 performs blank elimination processing. On the other hand, in a case where the user has not commanded that blank elimination processing be executed, the image processing control portion 330 does not perform blank elimination processing. A blank elimination processing portion that performs blank elimination processing and a frame erasure processing portion that performs frame erasure processing may be provided independently of each other. When accepting from the user a command as to whether or not blank elimination processing is to be executed, the operation panel 8 displays a setting screen S2 shown in FIG. 6. For example, the operation panel 8 displays the system menu (not shown) related to the overall operation of the apparatus. Upon an item related to blank elimination processing being selected from the system menu, the operation panel 8 displays the setting screen S2 shown in FIG. 6. The setting screen S2 shown in FIG. 6 is merely one example, and a screen layout or the like can be changed.

When the setting screen S2 is being displayed, upon an "ON" soft key K21 being touched and an "OK" soft key K22 being subsequently touched, the operation panel 8 accepts that blank elimination processing is to be executed. In a case where blank elimination processing is not to be executed, it is appropriate that a "OFF" soft key K23 be touched and the soft key 22 be subsequently touched.

Figure 7:
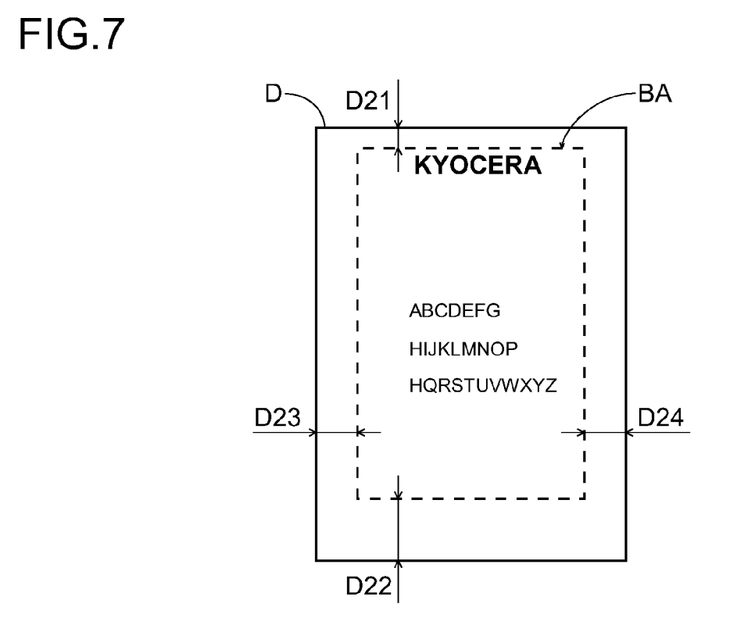
FIG. 7 is a view for explaining a blank detection area that is preset in the image forming apparatus shown in FIG. 1.

Furthermore, when displaying the setting screen S2, the operation panel 8 shows, on the setting screen S22, indication boxes in which set values indicative of a position (size) of a blank detection area are indicated, respectively. For example, it is assumed that an area BA enclosed by a broken line, which is shown in FIG. 7, has been set as a blank detection area. In this case, in the indication box C21, a spacing D21 between an upper end of the blank detection area BA and an upper end of the original document D (an upper end position of the blank detection area BA) is indicated, and in the indication box C22, a spacing D22 between a lower end of the blank detection area BA and a lower end of the original document D (a lower end position of the blank detection area BA) is indicated. In the indication box C23, a spacing D23 between a left end of the blank detection area BA and a left end of the original document D (a left end position of the blank detection area BA) is indicated, and in the Indication box C24, a spacing D24 between a right end of the blank detection area BA and a right end of the original document D (a right end position of the blank detection area BA) is indicated.

Moreover, on the setting screen S2, a minus key K24 and a plus key K25 for changing set values of the blank detection area BA are shown. Upon any one of the indication boxes C21 to C24 being touched, the operation panel 8 determines that a set value indicated in the touched indication box is a set value to be changed, and upon the minus key K24 or the plus key K25 being subsequently touched, the operation panel 8 adjusts the set value to be changed accordingly.

As for set values indicative of a position (size) of the blank detection area BA, for example, set values set before shipment of the apparatus may be stored in a storage portion (not shown) in the apparatus. In this case, if an operation for changing set values of the blank detection area BA is not performed, as the set values of the blank detection area BA, set values set before shipment of the apparatus are adopted.

Figure 8:
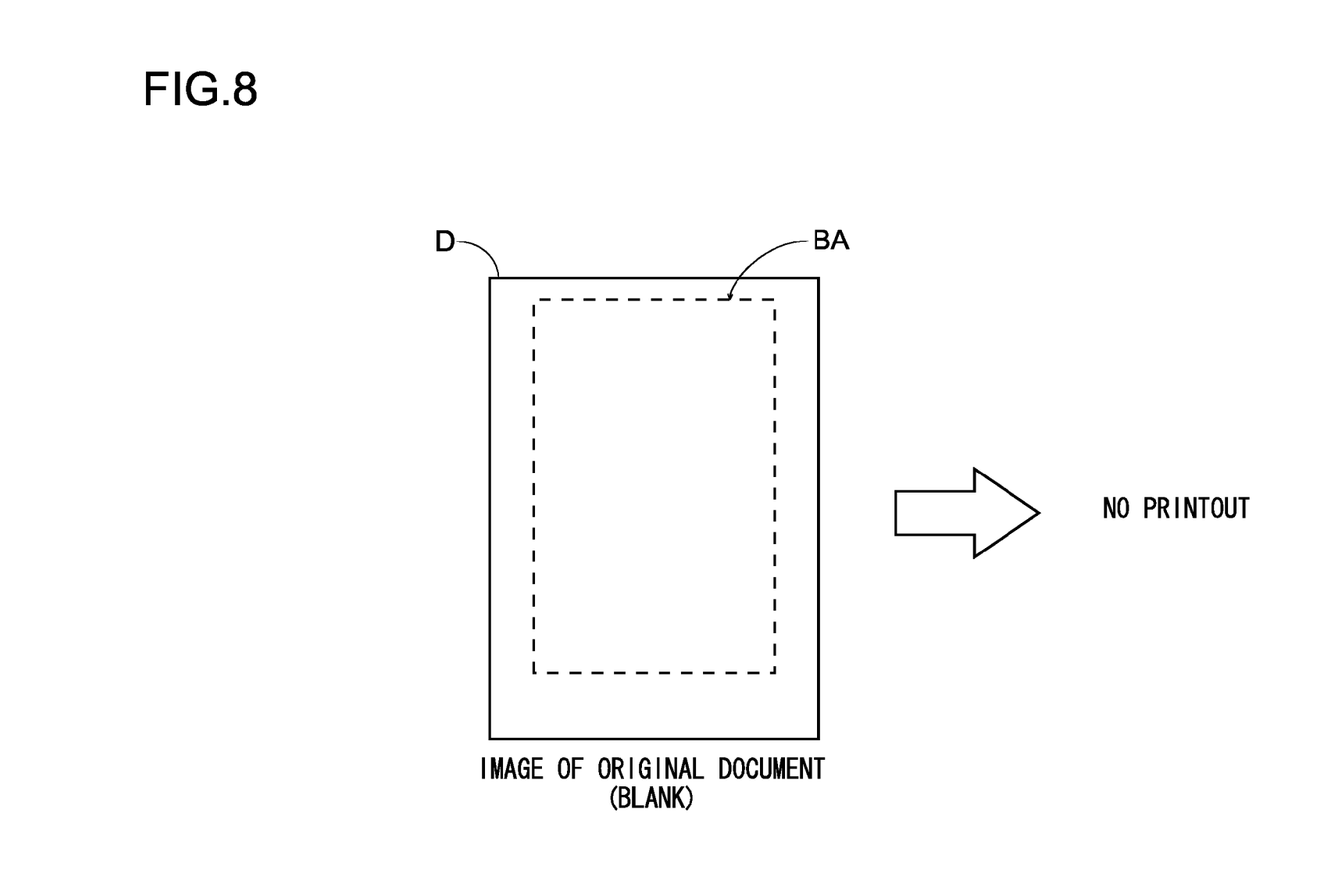
FIG. 8 is a view for explaining blank elimination processing performed in the image forming apparatus shown in FIG. 1.

In a case where a user has commanded that blank elimination processing be executed, after the original document D is read by the image reading portion 1, based on image data of the original document D obtained through the reading by the image reading portion 1, the image processing control portion 330 judges whether or not the blank detection area BA in the original document D is blank. For example, in a case where the number of colored pixels in the blank detection area BA in the original document D (the number of black pixels in a case of a monochrome image or the number of pixels of colors other than a texture color of the original document D in a case of a color image) falls below a predetermined threshold value, the image processing control portion 330 judges that the blank detection area BA in the original document D is blank. Then, the image processing control portion 330 eliminates the image data of the original document D if the blank detection area BA in the original document D is blank (does not perform frame erasure processing with respect thereto). That is, the image processing control portion 330 does not output the image data of the original document D to the printout section 7 if the blank detection area BA in the original document D is blank. Thus, as shown in FIG. 8, if there exists no image in the preset blank detection area BA in the original document D, image data of the original document D is eliminated, as a result of which printing is not performed.

(Processing in Case of Having Accepted Command to Execute Both of Blank Elimination Processing and Frame Erasure Processing)

Next, a description is given of processing in a case of having accepted a command to execute both of blank elimination processing and frame erasure processing.

In a case where a command to execute both of blank elimination processing and frame erasure processing has been accepted, the image processing control portion 330 performs blank elimination processing prior to performing frame erasure processing. Then, with respect to image data of the original document D, if not eliminated at the time of the blank elimination processing, the image processing control portion 330 performs image processing such as frame erasure processing and outputs the image data of the original document D thus subjected to the image processing to the printout section 7.

Figure 9:
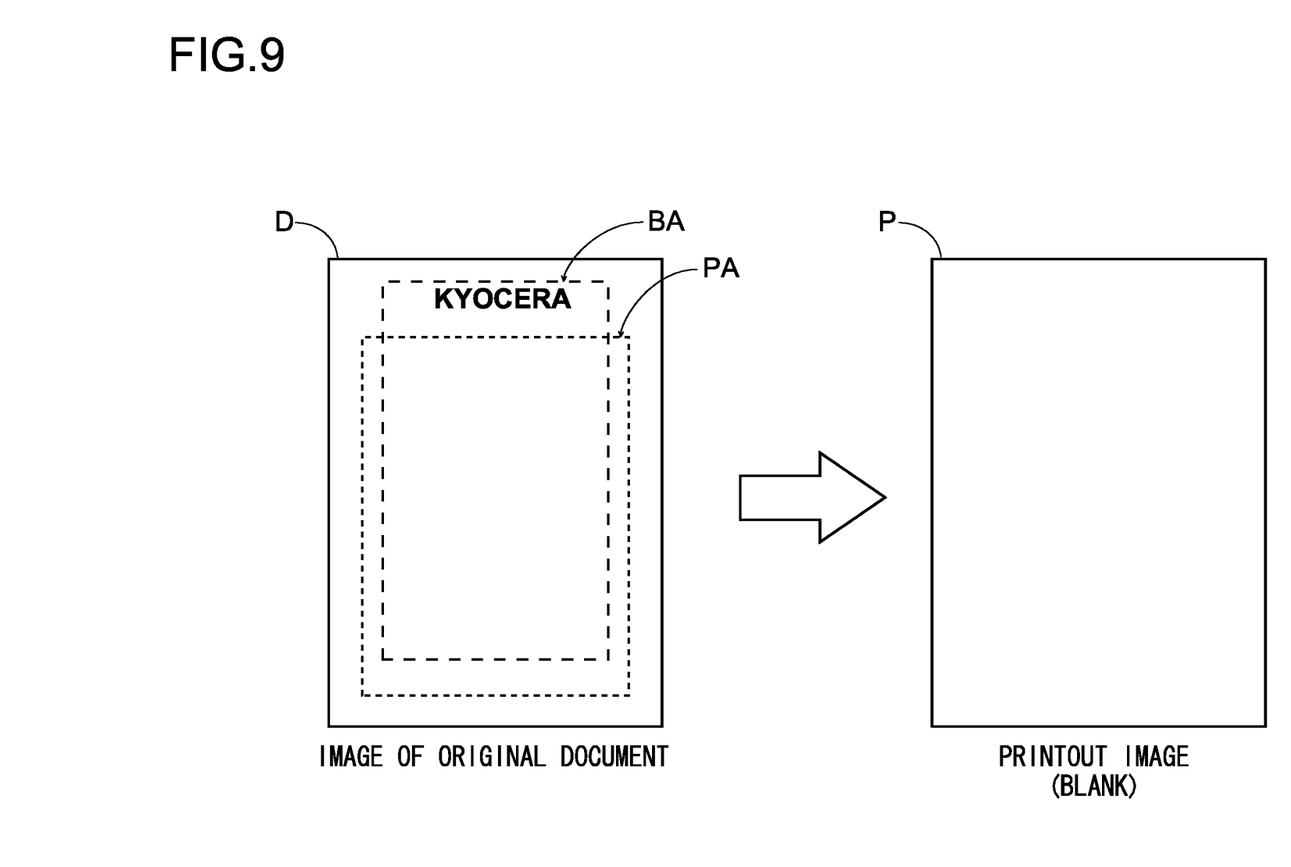
FIG. 9 is a view for explaining a problem that can arise in a case where both of blank elimination processing and frame erasure processing are executed.

Herein, for example, in a state where, as shown in FIG. 9, an image exists in the preset blank detection area BA in the original document D, and there exists no image in the preset printing area PA in the original document D, when the preset blank detection area BA in the original document D is designated as a target area for blank detection, the following inconvenience may arise.

That is, in an example shown in FIG. 9, the image exits in the preset blank detection area BA in the original document D. Since the preset blank detection area BA in the original document D, therefore, is not blank, at the time of blank elimination processing, the image processing control portion 330 does not eliminate image data of the original document D. Thereafter, with respect to the image data of the original document D, the image processing control portion 330 performs image processing such as frame erasure processing so that the image in an area other than the preset printing area PA in the original document D is not printed. Then, the image processing control portion 330 outputs the image data of the original document D thus subjected to the image processing to the printout section 7. Herein, in the example shown in FIG. 9, there exists no image in the preset printing area PA in the original document D. Consequently, there arises an inconvenience that the paper sheet P as a blank sheet with no image printed thereon is outputted.

Figure 10:
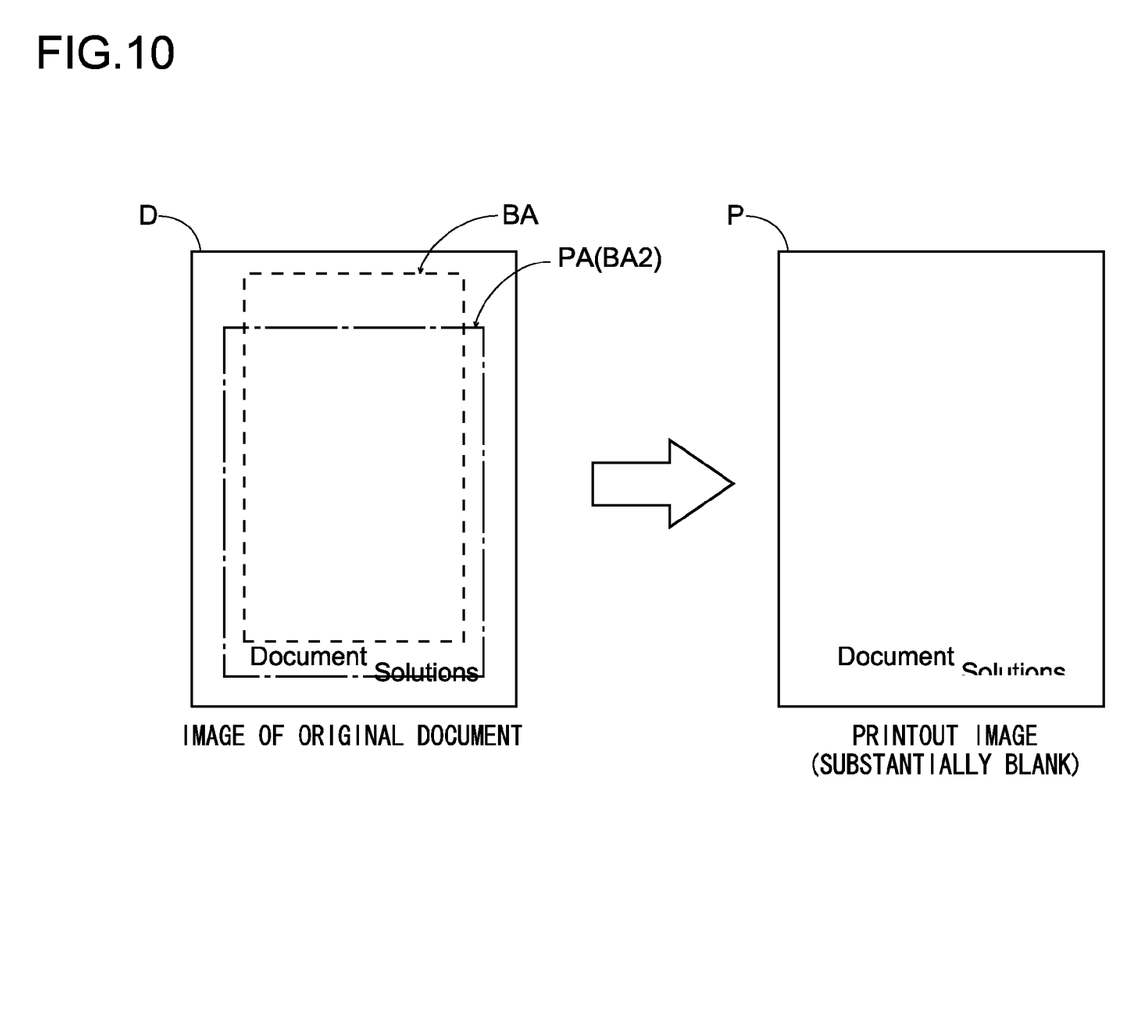
FIG. 10 is a view for explaining a problem that can arise in a case where the entirety of a printing area is set as a blank detection area.

Furthermore, for example, it is assumed that, as shown in FIG. 10, an image exists at an end of the preset printing area PA in the original document D, and the image is not contained in the preset blank detection area BA in the original document D. It is further assumed that the image at the end of the preset printing area PA in the original document D is unwanted by a user. In this case, normally, since the preset blank detection area BA in the original document D is blank, at the time of blank elimination processing, the image processing control portion 330 is supposed to eliminate image data of the original document D. Hence, the paper sheet P with the unwanted image printed thereon is not supposed to be outputted. In a case, however, where, as in the conventional technique, resetting is performed in which the entirety of the preset printing area PA in the original document D is newly set as a blank detection area BA2 (indicated by an alternate long and short dashed line), the following inconvenience arises.

That is, in an example shown in FIG. 10, while the preset blank detection area BA in the original document D does not contain the unwanted image, the blank detection area BA2 newly set by the resetting (namely, the printing area PA) contains the unwanted image. Since the blank detection area BA2 newly set by the resetting, therefore, is not blank, at the time of blank elimination processing, the image processing control portion 330 does not eliminate the image data of the original document D. Consequently, there arises an inconvenience that the paper sheet P as a substantially blank sheet with the unwanted image at the end of the preset printing area PA in the original document D printed thereon is outputted.

Figure 11:
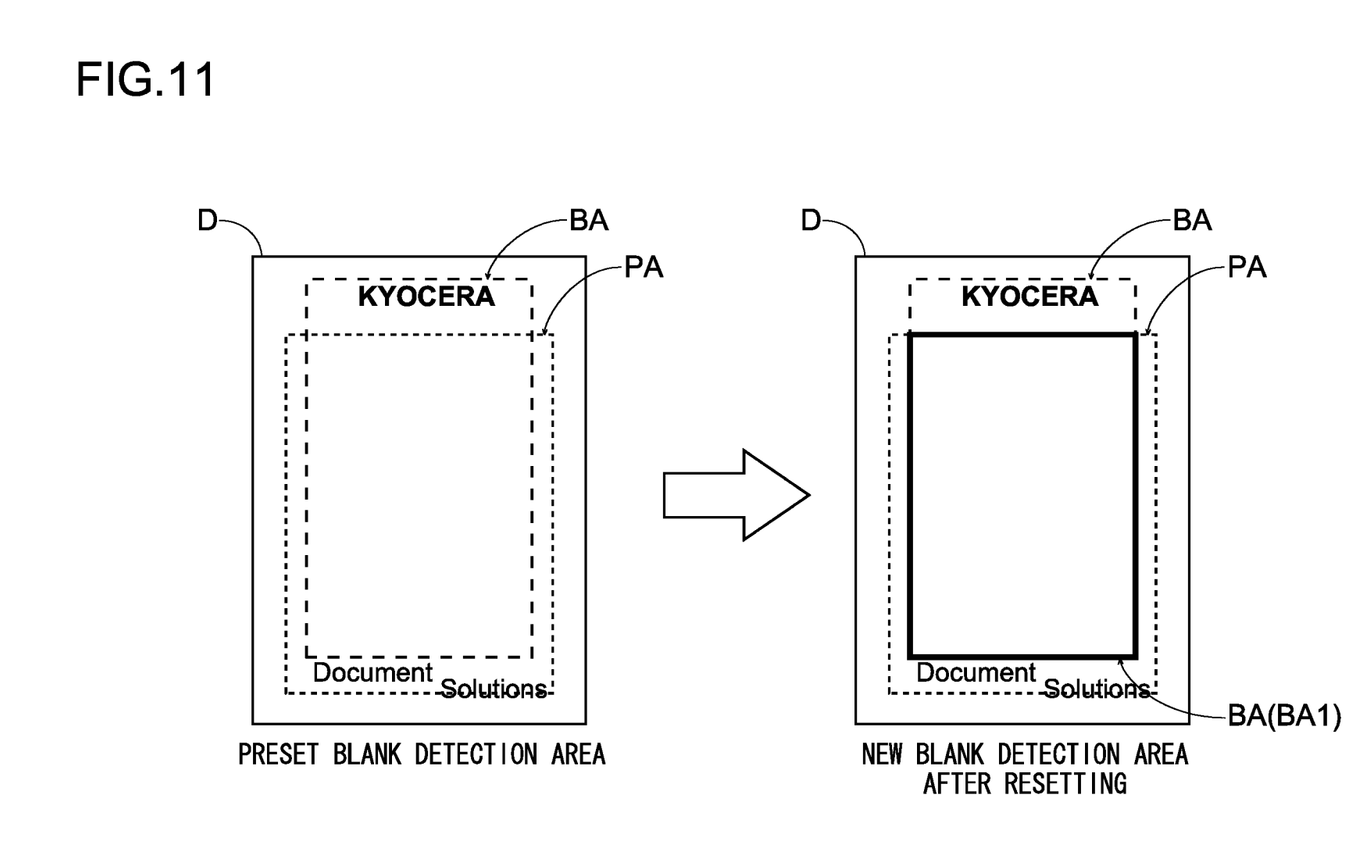
FIG. 11 is a view for explaining a blank detection area that is newly set by resetting in the image forming apparatus shown in FIG. 1.

As a solution to this, in this embodiment, when performing blank elimination processing in a case where frame erasure processing is to be performed, as shown in FIG. 11, the image processing control portion 330 performs resetting in which a superimposition area where the preset blank detection area BA and the preset printing area PA are superimposed on each other is set as a new blank detection area BA (BA1). Then, the image processing control portion 330 designates the new blank detection area BA (BA1) after the resetting as a target area for blank detection. In FIG. 11, the new blank detection area BA (BA1) after the resetting is indicated by a bold line.

For example, based on respective widths in a sub-scanning direction (a longitudinal direction in the figure) of the preset blank detection area BA and the preset printing area PA, the image processing control portion 330 calculates a width in the sub-scanning direction (the longitudinal direction in the figure) of the superimposition area where the preset blank detection area BA and the preset printing area PA are superimposed on each other. Furthermore, based on respective widths in a main scanning direction (a lateral direction in the figure) of the preset blank detection area BA and the preset printing area PA, the image processing control portion 330 calculates a width in the main scanning direction (the lateral direction in the figure) of the superimposition area where the preset blank detection area BA and the preset printing area PA are superimposed on each other.

For example, based on a comparison between the spacing D11 (see FIG. 4) indicative of the upper end position of the printing area PA and the spacing D21 (see FIG. 7) indicative of the upper end position of the blank detection area BA, an upper end position of the superimposition area is determined, and based on a comparison between the spacing D12 (see FIG. 4) indicative of the lower end position of the printing area PA and the spacing D22 (see FIG. 7) indicative of the lower end position of the blank detection area BA, a lower end position of the superimposition area is determined. In this manner, the width in the sub-scanning direction (the longitudinal direction in the figure) of the superimposition area where the blank detection area BA and the printing area PA are superimposed on each other can be calculated. Furthermore, based on a comparison between the spacing D13 (see FIG. 4) indicative of the left end position of the printing area PA and the spacing D23 (see FIG. 7) indicative of the left end position of the blank detection area BA, a left end position of the superimposition area is determined, and based on a comparison between the spacing D14 (see FIG. 4) indicative of the right end position of the printing area PA and the spacing D24 (see FIG. 7) indicative of the right end position of the blank detection area BA, a right end position of the superimposition area is determined. In this manner, the width in the main scanning direction (the lateral direction in the figure) of the superimposition area where the blank detection area BA and the printing area PA are superimposed on each other can be calculated.

Herein, in an example shown in FIG. 11, an image exits in the preset blank detection area BA, and an image unwanted by a user exists at an end of the preset printing area PA. In this case, when blank detection at the time of blank elimination processing is performed by using the preset blank detection area BA without resetting, the paper sheet P as a substantially blank sheet with the unwanted image at the end of the preset printing area PA in the original document D printed thereon is outputted (see FIG. 10).

Figure 12:
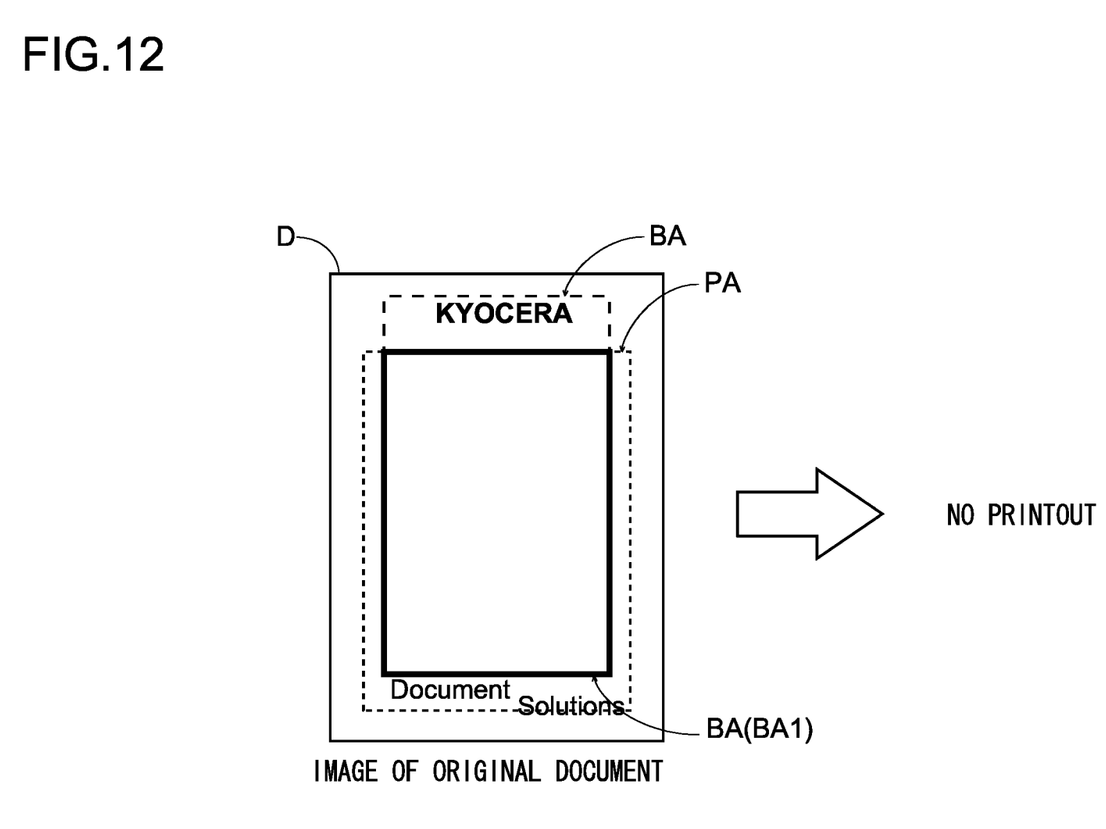
FIG. 12 is a view for explaining an effect obtained in a case where, in the image forming apparatus shown in FIG. 1, the new blank detection area after the resetting is designated as a target area for blank detection.

On the other hand, there exists no image in the new blank detection area BA (BA1) after the resetting. Since the new blank detection area BA (BA1) after the resetting, therefore, is blank, at the time of blank elimination processing, the image processing control portion 330 eliminates image data of the original document D. That is, the image processing control portion 330 does not output the image data of the original document D to the printout section 7. Thus, as shown in FIG. 12, in no case is the paper sheet P as a blank sheet with no image printed thereon outputted. Furthermore, also in no case is the paper sheet P as a substantially blank sheet with any image printed only at an end thereof (the paper sheet P with any image unwanted by a user printed thereon) outputted.

(Flow of Operation of Reading Original Document)

Figure 13:
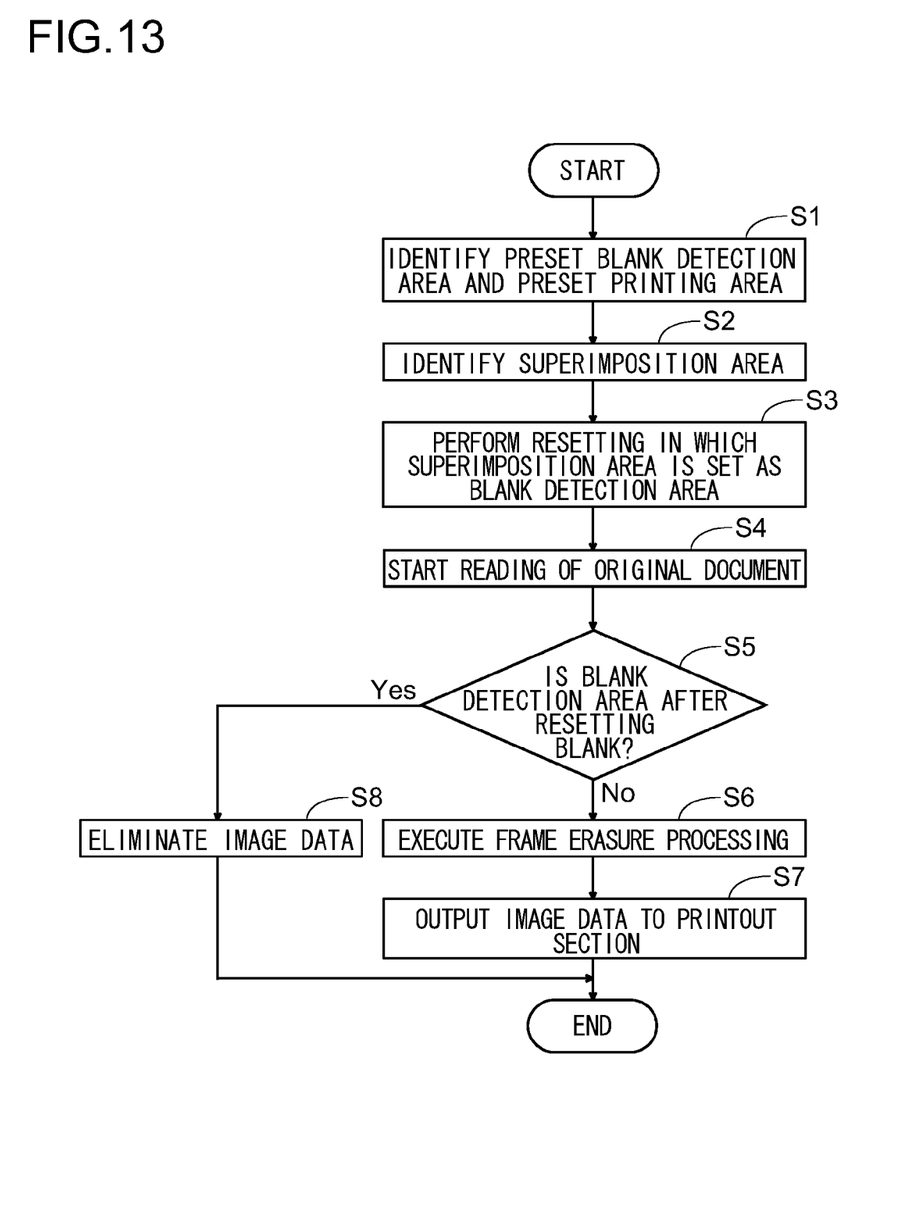
FIG. 13 is a flow chart for explaining an operation of reading an original document in the image forming apparatus shown in FIG. 1.

Next with reference to a flow chart of FIG. 13, a description is given of a flow of an operation of reading the original document D in a case of having accepted a command to execute both of blank elimination processing and frame erasure processing.

First, it is assumed that, at a starting point in time of the flow chart of FIG. 13, a command to execute both of blank elimination processing and frame erasure processing has been accepted. That is, it is assumed that the blank detection area BA and the printing area PA have been preset. When a command to execute a copying job is accepted, the flow chart of FIG. 13 is started.

At Step S1, the image processing control portion 330 identifies the preset blank detection area BA and the preset printing area PA. At Step S2, the image processing control portion 330 identifies a superimposition area where the preset blank detection area BA and the preset printing area PA are superimposed on each other. At Step S3, the image processing control portion 330 performs resetting in which the superimposition area thus identified is set as the new blank detection area BA (BA1).

At Step S4, the image reading device 100 starts reading of the original document D.

At Step S5, based on image data of the original document D obtained through the reading by the image reading portion 1, the image processing control portion 330 judges whether or not the new blank detection area BA (BA1) after the resetting is blank. If, as a result of the judgment, it is judged that the new blank detection area BA (BA1) after the resetting is not blank, a transition is made to Step S6.

Upon the transition to Step S6, the image processing control portion 330 performs frame erasure processing with respect to the image data of the original document D. That is, the image processing control portion 330 corrects the image data of the original document D so that any image in an area other than the preset printing area PA is not printed. Thereafter, at Step S7, the image processing control portion 330 outputs the image data of the original document D thus subjected to image processing to the printout section 7.

On the other hand, in a case where, at Step S5, it is judged that the new blank detection area BA (BA1) after the resetting is blank, a transition is made to Step S8. Upon the transition to Step S8, the image processing control portion 330 eliminates the image data of the original document D. That is, the image processing control portion 330 does not output the image data of the original document D to the printout section 7.

As discussed above, the image reading device 100 according to this embodiment includes the image reading portion 1 that reads the original document D and the image processing control portion 330 (the blank elimination processing portion, the frame erasure processing portion) that, based on image data of the original document D obtained through reading by the image reading portion 1, judges whether or not the preset blank detection area BA in the original document D is blank, performs blank elimination processing for eliminating the image data of the original document D if the preset blank detection area BA is blank, and performs frame erasure processing for correcting the image data of the original document D so that any image in an area other than the preset printing area PA in the original document D is not printed. When performing the blank elimination processing in a case where the frame erasure processing is to be performed, the image processing control portion 330 performs resetting in which a superimposition area where the preset blank detection area BA and the preset printing area PA are superimposed on each other is set as the new blank detection area BA (BA1), and designates the new blank detection area BA (BA1) after the resetting as a target area for blank detection. That is, when performing the blank elimination processing in the case where the frame erasure processing is to be performed, the image processing control portion 330 designates as a target area for blank detection, an area in the preset blank detection area BA, which includes at least part of the preset printing area PA, and excludes from the target area for blank detection, an area in the preset blank detection area BA, which does not include the preset printing area PA at all. Thus, in a case where, as the original document D, an original document in which there exists no image in the preset printing area PA is read, the image processing control portion 330 can reliably eliminate image data of the original document D. As a result, the paper sheet P as a blank sheet with no image printed thereon can be prevented from being outputted. Furthermore, even if any image unwanted by a user exists in the preset printing area PA, as long as the unwanted image is not contained in the preset blank detection area BA, the unwanted image is not contained in the new blank detection area BA (BA1) after the resetting. Thus, the paper sheet P with any unwanted image printed thereon (the paper sheet P as a substantially blank sheet with, for example, any image printed only at an end thereof) also can be prevented from being outputted.

Furthermore, in this embodiment, as discussed above, the image processing control portion 330 performs blank elimination processing prior to performing frame erasure processing. With this configuration, if the blank detection area BA is blank, image data of the original document D in which the blank detection area BA is blank is eliminated, leaving no image data of the original document D to be subjected to frame erasure processing, so that frame erasure processing can be omitted.

The embodiment disclosed herein is to be construed in all respects as illustrative and not limiting. The scope of the present disclosure is indicated by the appended claims rather than by the description of the foregoing embodiment, and all changes that come within the meaning and range of equivalency of the claims are intended to be embraced therein.

For example, while the foregoing embodiment exemplarily describes a case where an image based on image data of an original document obtained through reading by an image reading device is printed on a paper sheet, which then is outputted, the present disclosure is not limited thereto. As one example, there is a case where an image reading device and a display device such as a personal computer are connected to each other in a communicable manner, and an image based on image data of an original document obtained through reading by the image reading device is displayed on the display device. In this case, by adopting a configuration in which an image based on image data of an original document obtained through reading by the image reading device of the present disclosure is displayed on the display device, it is possible to prevent an image such as resulting from reading a blank original document from being displayed.

What is claimed is:

1. An image reading device, comprising:
    an image reading portion that reads an original document;
    a blank elimination processing portion that, based on image data of a page of an original document obtained through the reading by the image reading portion, judges whether or not a preset blank detection area in the page is blank, and performs blank elimination processing for prohibiting a printout of the page if the preset blank detection area in the page is blank; and a frame erasure processing portion that performs frame erasure processing for correcting image data of an original document obtained through the reading by the image reading portion so that any image in an area other than a preset effective image area in the original document does not appear, wherein in a case of having accepted a command to execute both of blank elimination processing and frame erasure processing, when performing the blank elimination processing in a case where the frame erasure processing portion is to perform the frame erasure processing, the blank elimination processing portion performs resetting in which a superimposition area where the preset blank detection area and the preset effective image area are superimposed on each other is set as a new blank detection area, and designates the new blank detection area after the resetting as a target area for blank detection.

2. The image reading device according to claim 1, further comprising an operation portion that accepts an operation for changing a set value indicative of a position and a size of the preset blank detection area.

3. The image reading device according to claim 1, further comprising an operation portion that accepts an operation for changing a set value indicative of a position and a size of the preset effective image area.

4. An image forming apparatus, comprising:
the image reading device according to claim 1; and
a printout section that, based on image data of an original document obtained through the reading by the image reading device, prints an image of the original document on a paper sheet and outputs the paper sheet.

5. An image forming apparatus, comprising:
an image reading portion that reads an original document;
a printout section that, based on image data of an original document obtained through the reading by the image reading device, prints an image of the original document on a paper sheet and outputs the paper sheet; and
an image processing control portion that has a blank elimination processing portion and a frame erasure processing portion,
wherein
the blank elimination processing portion, based on image data of a page of an original document obtained through the reading by the image reading portion, judges whether or not a first blank detection area in the page is blank, and performs blank elimination processing for prohibiting a printout of the page if the first blank detection area in the page is blank; and the frame erasure processing portion performs frame erasure processing for correcting image data of an original document obtained through the reading by the image reading portion so that any image in an area other than a preset effective image area in the original document does not appear, in a case of having accepted a command to execute blank elimination processing only, and not having accepted a command to execute frame erasure processing, the blank elimination processing portion, based on image data of a page of an original document obtained through the reading by the image reading portion, judges whether or not the first blank detection area in the page is blank, and performs blank elimination processing for prohibiting a printout of the page if the first blank detection area in the page is blank, in a case of having accepted a command to execute both of blank elimination processing and frame erasure processing, when performing the blank elimination processing in a case where the frame erasure processing portion is to perform the frame erasure processing, the blank elimination processing portion performs resetting in which a superimposition area where the first blank detection area and the preset effective image area are superimposed on each other is set as a second blank detection area, and designates the second blank detection area after the resetting as a target area for blank detection, and the blank elimination processing portion, based on image data of a page of an original document obtained through the reading by the image reading portion, judges whether or not the second blank detection area in the page is blank, and performs blank elimination processing for prohibiting a printout of the page if the second blank detection area in the page is blank, and in a case where the user has not commanded that blank elimination processing be executed, the image processing control portion does not perform blank elimination processing.

6. The image forming apparatus according to claim 5, further comprising an operation portion that accepts an operation for changing a set value indicative of a position and a size of the preset blank detection area.

7. The image forming apparatus according to claim 5, further comprising an operation portion that accepts an operation for changing a set value indicative of a position and a size of the preset effective image area.

* * * * *